United States Patent
Trecapelli et al.

(10) Patent No.: US 10,596,642 B2
(45) Date of Patent: Mar. 24, 2020

(54) TOOL AND TOOL HOLDER ASSEMBLY

(71) Applicant: Gemini Precision Machining, Inc., Bad Axe, MI (US)

(72) Inventors: Anthony Trecapelli, Leonard, MI (US); David W. Barton, Port Matilda, PA (US); John Winebrenner, Latrobe, PA (US)

(73) Assignee: Gemini Precision Machining, Inc., Bad Axe, MI (US)

( * ) Notice: Subject to any disclaimer, the term of this patent is extended or adjusted under 35 U.S.C. 154(b) by 109 days.

(21) Appl. No.: 15/684,105

(22) Filed: Aug. 23, 2017

(65) Prior Publication Data

US 2019/0061025 A1 Feb. 28, 2019

(51) Int. Cl.
*B23C 5/26* (2006.01)
*B23B 31/107* (2006.01)

(52) U.S. Cl.
CPC ............ *B23C 5/26* (2013.01); *B23B 31/1075* (2013.01); *B23C 2240/24* (2013.01); *B23C 2250/04* (2013.01); *B23C 2250/16* (2013.01)

(58) Field of Classification Search
CPC ......... B23C 5/26; B23C 5/10; B23C 2240/24; B23C 2270/08; B23B 2250/16; B23B 2250/04; B23B 31/1075; Y10T 409/30952; Y10T 407/1932; Y10T 407/1934
See application file for complete search history.

(56) References Cited

U.S. PATENT DOCUMENTS

| 1,958,817 | A | * | 5/1934 | Gase | B23B 31/1075 279/83 |
| 2,273,102 | A | * | 2/1942 | Harris | F16B 39/284 403/362 |
| 2,355,899 | A | * | 8/1944 | Beede | F16B 35/005 403/316 |
| 3,557,419 | A | | 1/1971 | Flannery | |

(Continued)

FOREIGN PATENT DOCUMENTS

| DE | 3019970 A1 | * 12/1981 | ......... B23B 31/1076 |
| EP | 0112788 A1 | * 7/1984 | ......... B23B 31/1076 |

(Continued)

OTHER PUBLICATIONS

International Search Report for Application No. PCT/US2018/047704 dated Dec. 12, 2018.

*Primary Examiner* — Ryan C Rufo
(74) *Attorney, Agent, or Firm* — Fishman Stewart PLLC

(57) ABSTRACT

An assembly of a tool and a tool holder may include the tool, which may have an elongated body with a socket, and the tool holder, which may have a body with a first bore configured to receive at least a portion of the elongated body, and a second bore substantially transverse to the first bore. The assembly may also have an impinging member including a body having an end with a radial surface. In an assembled state, a portion of the elongated body of the tool may be positioned within the first bore of the body of the tool such that the socket and the second bore may be substantially aligned, and the body of the impinging member may be positioned within the second bore with the radial surface pressed against the elongated body in the socket at a predetermined torque.

17 Claims, 7 Drawing Sheets

(56) References Cited

U.S. PATENT DOCUMENTS

| | | | | |
|---|---|---|---|---|
| 3,584,667 | A * | 6/1971 | Reiland | B25B 13/065 411/402 |
| 3,762,731 | A * | 10/1973 | Matsumoto | B23B 31/202 279/51 |
| 4,133,545 | A * | 1/1979 | Komori | B23B 31/00 279/126 |
| 4,377,292 | A * | 3/1983 | Staron | B23B 31/1074 279/46.1 |
| 4,611,960 | A * | 9/1986 | Quenneville | B23B 31/1075 269/241 |
| 4,668,138 | A | 5/1987 | Carter | |
| 4,797,041 | A * | 1/1989 | Glaser | B23B 31/1077 409/232 |
| 4,979,845 | A * | 12/1990 | Scheer | B23B 31/1077 403/154 |
| 6,142,485 | A * | 11/2000 | Muller | B23B 31/1075 279/83 |
| 9,676,037 | B2 * | 6/2017 | Herud | B23B 31/1074 |
| 2002/0158425 | A1 | 10/2002 | Chen | |
| 2005/0238451 | A1 * | 10/2005 | Hartman | B23B 31/008 409/234 |
| 2009/0295104 | A1 | 12/2009 | Cover | |
| 2012/0148359 | A1 * | 6/2012 | Zurn | B23B 31/1075 408/204 |
| 2013/0115023 | A1 * | 5/2013 | Haimer | B23C 5/26 409/234 |
| 2018/0141132 | A1 * | 5/2018 | Berg | B23B 31/02 |

FOREIGN PATENT DOCUMENTS

| | | | | |
|---|---|---|---|---|
| GB | 191329908 A * | 2/1915 | ......... | B23B 31/1075 |
| WO | WO-03006194 A1 * | 1/2003 | ......... | B23B 31/1071 |
| WO | 2011-066172 A2 | 6/2011 | | |

* cited by examiner

TOOL AND TOOL HOLDER ASSEMBLY

FIELD OF TECHNOLOGY

The present disclosure pertains to an assembly of a tool, such as an end mill, and a tool holder, and a method of assembly thereof.

BACKGROUND

Machines are used to perform manufacturing operations such as milling, cutting, drilling, and the like. Such machines generally have an end tool that comes into contact with a workpiece. The end tool is typically held in place by a tool holder, which in turn is connected to a spindle of the machine. To perform the manufacturing operation, the tool is spun at very high speeds. However, such high rotational speeds often result in a noise or chatter, which is caused by a resonant frequency that is created when the tool vibrates relative to the spindle. Chatter may limit performance, results, life of the tool, and/or effectiveness of the tool. Chatter generally may occur when the tool enters and exits cutting. The tool deflects when it (e.g., a tooth of the tool) makes contact with a workpiece, and then snaps back when the tool exits the workpiece, thereby causing vibration of the tool. Many tool holder systems hold the tool using only friction. This may lead to the tool twisting during the cut, which can change the vibrational frequency of the tool, thereby resulting in even more chatter.

Accordingly, an improved, tool and tool holder assembly is presented that allows for a solid attachment of the tool and tool holder while minimizing chatter.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description.

DETAILED DESCRIPTION

To minimize chatter during operation of a tool, such as an end mill, an exemplary assembly may include the tool, which may have an elongated body with a socket, and a tool holder, which may have a body with a first bore configured to receive at least a portion of the elongated body, and a second bore substantially transverse to the first bore. The assembly may also have an impinging member including a body having an end with a radial surface. In an assembled state, a portion of the elongated body of the tool may be positioned within the first bore of the body of the tool such that the socket and the second bore may be substantially aligned, and the body of the impinging member may be positioned within the second bore with the radial surface pressed against the elongated body in the socket at a predetermined torque.

An exemplary method for assembling a tool assembly is configured to minimize chatter. Such assembly, described above, may include inserting a portion of an elongated body of a tool into a first bore of a body of a tool holder until a socket in the elongated body is substantially aligned with a second bore in the body of the tool holder that is transverse to the first bore. The method may then include inserting an impinging member into the second bore until a radial surface of an end of a body of the impinging member applies a predetermined torque to the elongated body in the socket.

Figure 1A:
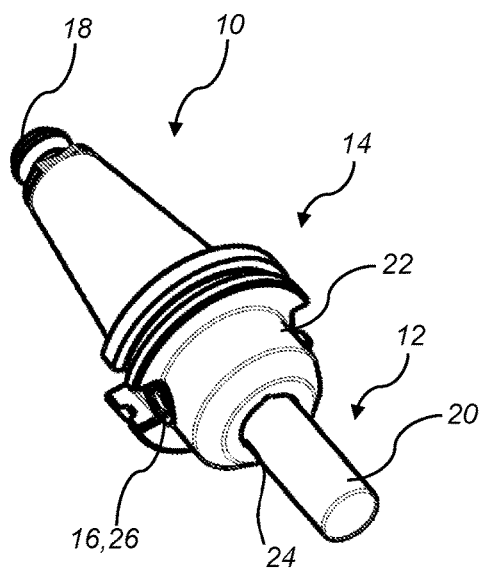
FIGS. 1A and 1B are perspective and partial cross-sectional views, respectively, of an exemplary assembly of a tool and a tool holder in an assembled state.
Figure 1B:
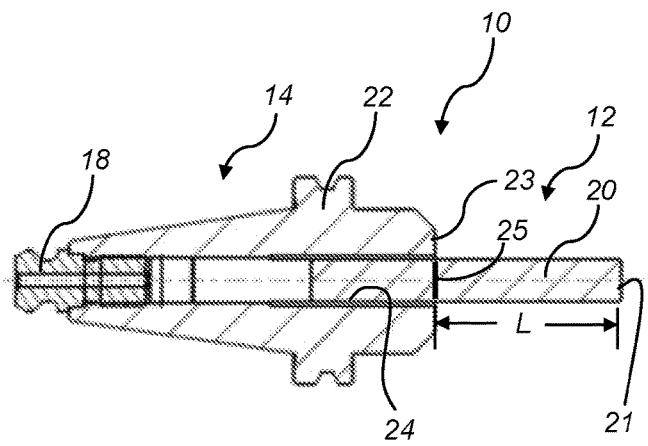
Figure 2:
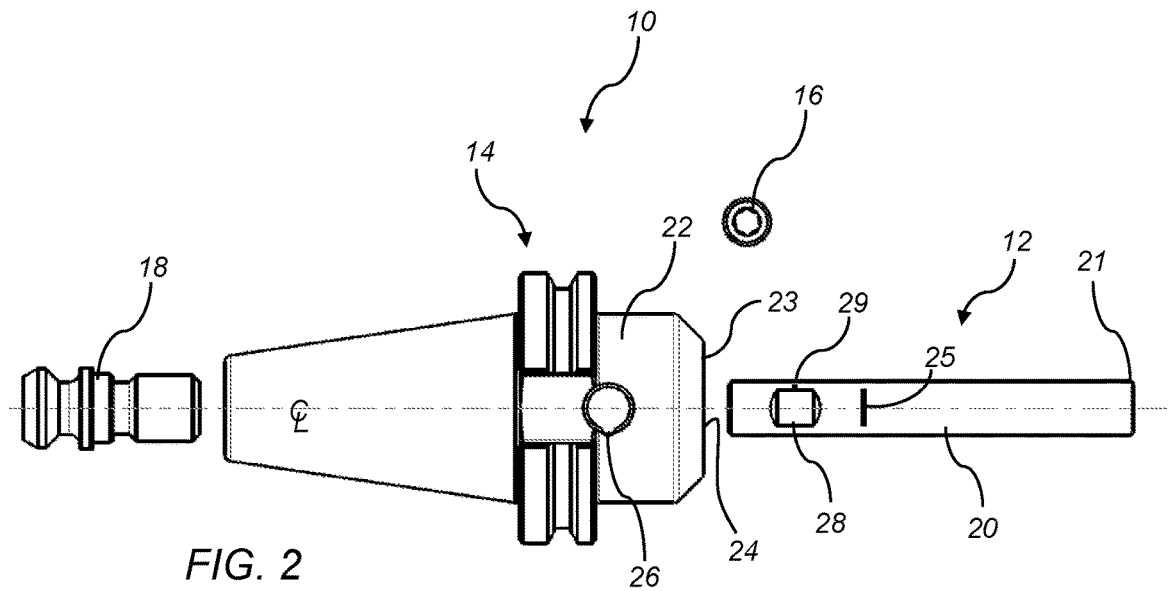
FIG. 2 is a top view of the assembly of FIGS. 1A and 1B in a disassembled state.

Referring now to the figures, FIGS. 1A, 1B, and 2 illustrate an exemplary assembly 10 of a tool 12 and a tool holder 14. The assembly 10 generally may be used together with a machine (not shown) to perform such manufacturing operations as milling, cutting, drilling, and the like. During such operations, a tool and tool holder may be spun at very high speeds by the machine. Such high rotational speeds are often associated with chatter, which may affect the quality of the result of the manufacturing operation, the effectiveness of the tool, and/or the life of the tool. The assembly 10 is designed to minimize the chatter based on specific positioning of the tool 12 and the tool holder 14 with respect to each other. In addition to the tool 12 and the tool holder 14, the assembly 10 may also include an impinging member 16, described in more detail hereinafter, which may be configured to hold the tool 12 and the tool holder 14 together. The impinging member 16 may be, but is not limited to, a screw. The assembly 10 may further include a torque retention knob 18 by which the assembly 10 may be attachable to the machine, for example, to a spindle of the machine.

The tool 12 may be, but is not limited to, an end mill, and generally may include an elongated body 20. The tool holder 14 may include a body 22 defining a first or axial bore 24 running in an axial direction parallel to the centerline, and may be configured to receive at least a portion of the elongated body 20. The body 22 may also define a second or radial bore 26 running in a radial direction and substantially transverse to the first bore 24, and may be configured to receive the impinging member 16. The elongated body 20 may also have a flat or socket 28 at which the impinging member 16 may be threaded and/or advanced to engage with the elongated body 20 to securely hold the tool 12 and the tool holder 14 together.

In an assembled state of the assembly 10, the elongated body 20 of the tool 12 may be positioned within the first bore 24 of the body 22 of the tool holder 14 such that the socket 28 may be substantially aligned with the second bore 26. The elongated body 20 may have a mark 25 where the elongated body 20 should be aligned with a proximate end 23 of the body 22, thus providing a visual indicator for a user of the assembly 10 how far the elongated body 20 should be inserted into the first bore 24 such that the socket 28 may be substantially aligned with the second bore 26. The impinging member 16 may be positioned within the second bore 26 such that it impinges upon or presses against the elongated body 20 in the socket 28, thereby securing the tool 12 in the tool holder 14. The socket 28 may have a defined location on the elongated body 20 in order to provide for a defined stick out length L, or the length from a distal end 21 of the elongated body 20 to the proximate end 23 of the body 22, as illustrated in FIG. 1B.

During operation of the assembly 10, e.g., high speed rotation of the assembly 10, the tool 12 may experience oscillation, such as back and forth frequencies. The tool 12 also may experience frequencies caused when the tool 12, specifically teeth of the tool 12 (not shown), impact a particular workpiece to be cut or otherwise worked on. Chatter may be limited when the back and forth frequencies and the impact frequencies match or are aligned. The stick out length L may be defined to allow for high frequencies and short amplitudes, thereby providing more opportunities to match each impact of the tool 12 (the teeth) with the workpiece, and therefore, higher stable speeds, i.e., less chatter. The stick out length L may vary for different tools 12 based on different parameters or factors, including, but not limited to, the diameter of the tool 12.

In addition, to maintain a solid clamping of the elongated body 20 within the first bore 24 and maintain the high frequencies and short amplitudes enabled by the defined stick out length L, the impinging member 16 may apply a predetermined torque on the elongated body 20 in the socket 28. While the predetermined torque may be any magnitude, a torque value of 25 ft/lbs has been found to be particularly effective in minimizing chatter. The shape and/or configuration of the impinging member 16 and/or the socket 28 may contribute to the ability of the impinging member 16 to effectively apply the predetermined torque on the elongated body 20.

Figure 3A:
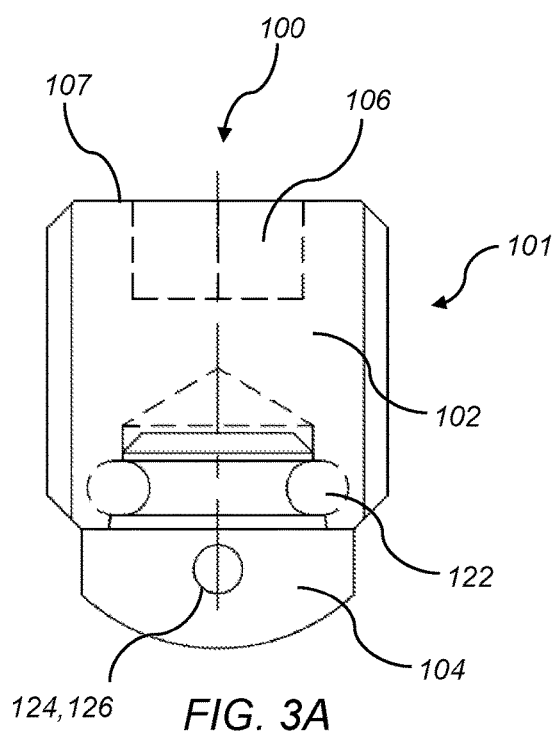
FIGS. 3A and 3B are front and side views, respectively, of an impinging member of the assembly of FIGS. 1A and 1B according to one exemplary approach.
Figure 3B:
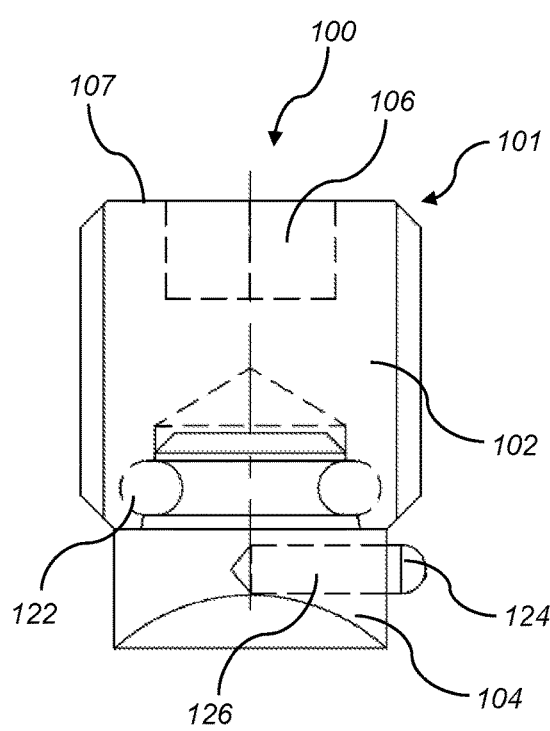
Figure 4A:
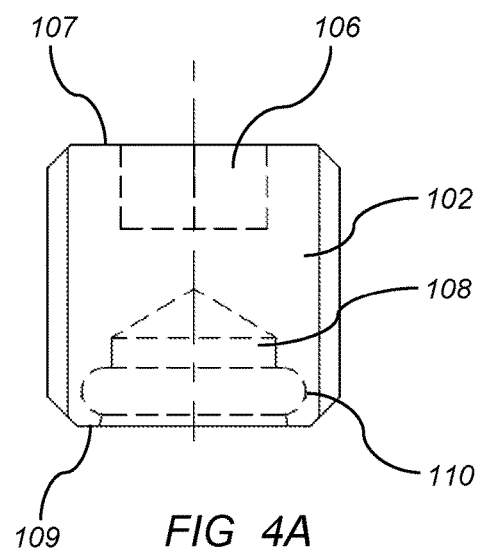
FIGS. 4A and 4B are front and top views, respectively, of a body portion of the impinging member of FIGS. 3A and 3B.
Figure 4B:
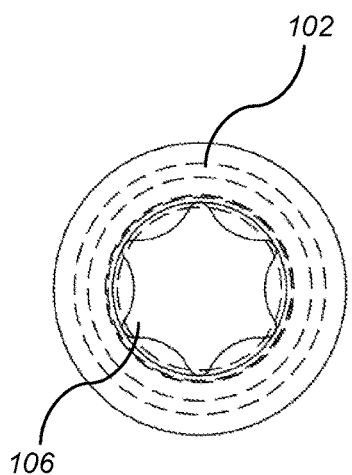
Figure 5A:
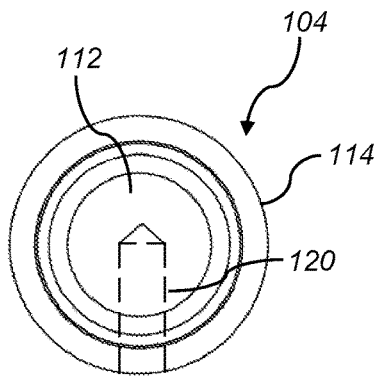
FIGS. 5A-5C are top, front, and side views, respectively, of a head portion of the impinging member of FIGS. 3A and 3B.
Figure 5B:
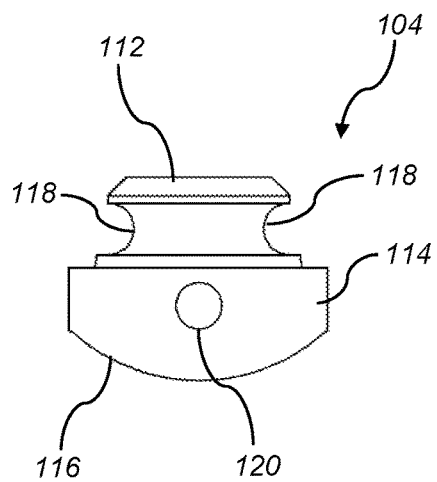
Figure 5C:
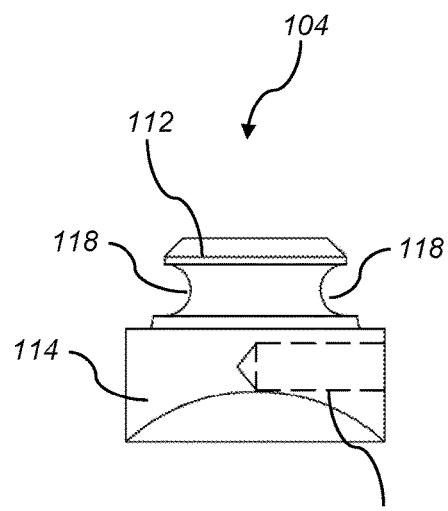

Referring now to FIGS. 3A and 3B, an impinging member 16, 100 according to one exemplary approach is illustrated. The impinging member 100 may have a body 101 that may include a body portion 102 and a head portion 104. The body portion 102 and the head portion 104 may be separate and distinct components, or may be integral with one another such that the body 101 is a unitary component. The body portion 102 as a separate component is illustrated in FIGS. 4A and 4B. The head portion 104 as a separate component is illustrated in FIGS. 5A-5C. The body portion 102 and the head portion 104 may be securely connected to each other by a seal 122, which may be, but is not limited to, an O-ring.

Referring now to FIGS. 4A and 4B, the body portion 102 may be generally cylindrically shaped, for example, where the impinging member 100 is a screw. However, it should be appreciated that the body portion 102 may have any shape capable of fitting within the second bore 26 of the body 22 of the tool holder 14. The body portion 102 may include a first cavity 106 at a top end 107 thereof to receive an insertion tool, e.g., a screwdriver, to insert, e.g., screw, the impinging member 100 into the second bore 26. While the first cavity 106 generally may have any shape, including, but not limited to, a slot, a Phillips cross, a square, a hex, and the like, a star shape (or Torx), as illustrated in FIG. 4B, has been found to be particularly effective in achieving the predetermined torque value. The body portion 102 may also have a second cavity 108 at a bottom end 109 configured to receive a portion of the head portion 104. The body portion 102 may further include a groove 110 around at least a portion of the second cavity 108, and may be configured to receive at least a portion of the seal 122.

Referring now to FIGS. 5A-5C, the head portion 104 may have a first or insertion portion 112 that may be inserted into the second cavity 108 such that the body portion 102 and the head portion 104 may be joined together. The head portion 104 may also have a second or engagement portion 114 that may engage with the elongated body 20 at the socket 28 of the tool 12. The second portion 114 may have a radial surface 116 having a curved profile or shape, and the socket 28 may have substantially the same profile or shape. The radial surface 116 reduces or eliminates any stress between the second portion 114 and the elongated body 20 that may result from profiles or shapes having sharp corners. The radial surface 116 may be spaced axially from the bottom end 109 of the body portion 102 when the body portion 102 and the head portion 104 are joined together, as shown in FIG. 3A. The head portion 104 may further have a groove 118 at least partially around the first portion 112 that corresponds to the groove 110 in the body portion 102. The groove 118 may similarly be configured to receive at least a portion of the seal 122.

While FIGS. 4B and 5A illustrate the body portion 102 and the head portion 104 as having generally circular cross-sectional shapes, it should be appreciated that they may have any cross-sectional shape, including a circular shape with squared opposing edges, similar to the head portion 304 illustrated in FIG. 11A and described in more detail hereinafter.

Referring back to FIGS. 3A and 3B, the impinging member 100 may further include an extension 124 extending radially from the head portion 104. In the assembled state of the assembly 10, extension 124 may sit in a groove 29 in the elongated body 20 of the tool 12. The location of the groove 29 may correspond to the predetermined torque. Specifically, the predetermined torque may not be achieved until the extension 124 is seated within the groove 29. Thus, the extension 124 and the corresponding groove 29 may provide a visual and/or tactile indication that the predetermined torque has been achieved. The extension 124 may be an end portion of a pin 126. The head portion 104 may define a channel 120, as shown in FIGS. 5A-5C, in which the pin 126 may be inserted. Alternatively, the extension 124 may be integral with the head portion 104.

Figure 6A:
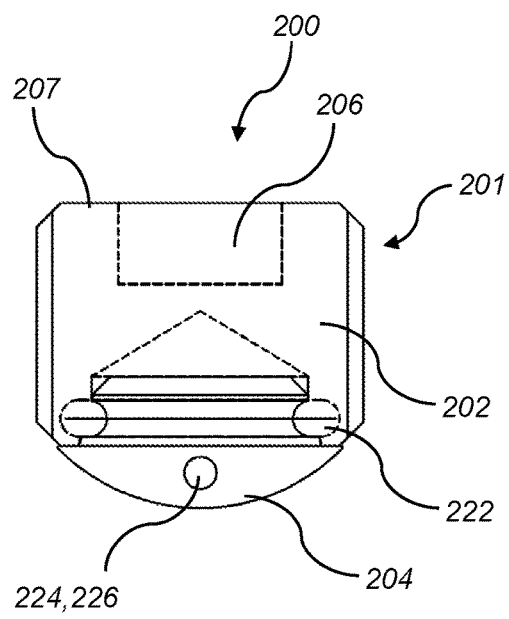
FIGS. 6A and 6B are front and side views, respectively, of an impinging member of the assembly of FIGS. 1A and 1B according to another exemplary approach.
Figure 6B:
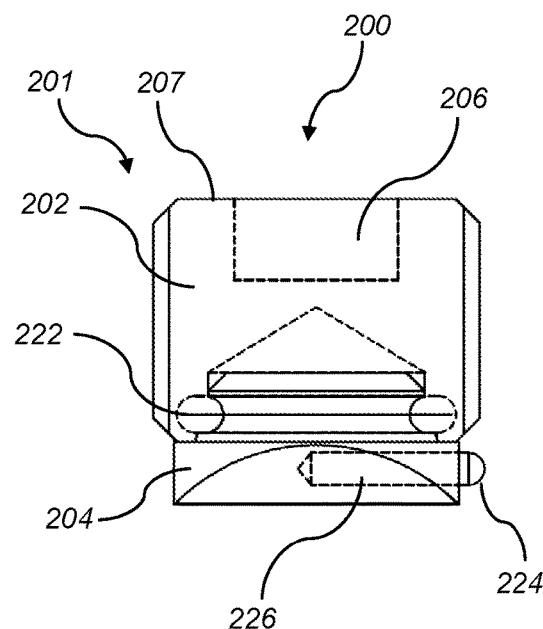
Figure 7A:
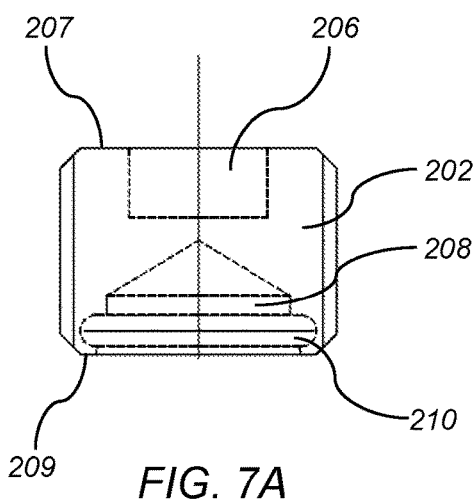
FIGS. 7A and 7B are front and top views, respectively, of a body portion of the impinging member of FIGS. 6A and 6B.
Figure 7B:
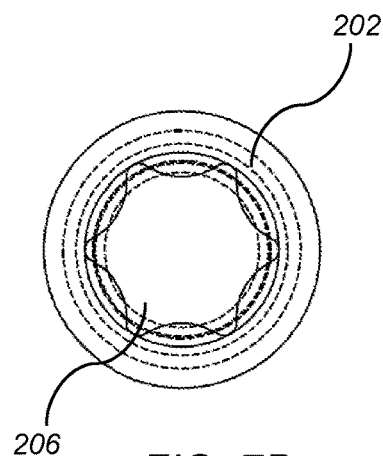
Figure 8A:
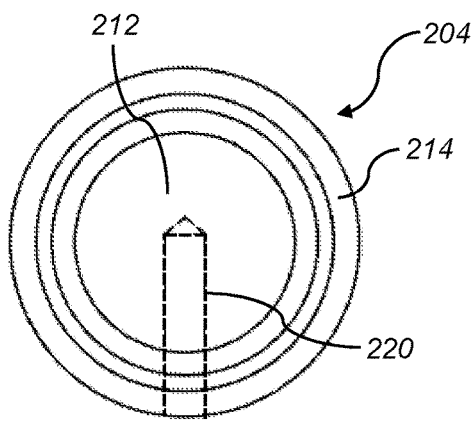
FIGS. 8A-8C are top, front, and side views, respectively, of a head portion of the impinging member of FIGS. 6A and 6B.
Figure 8C:
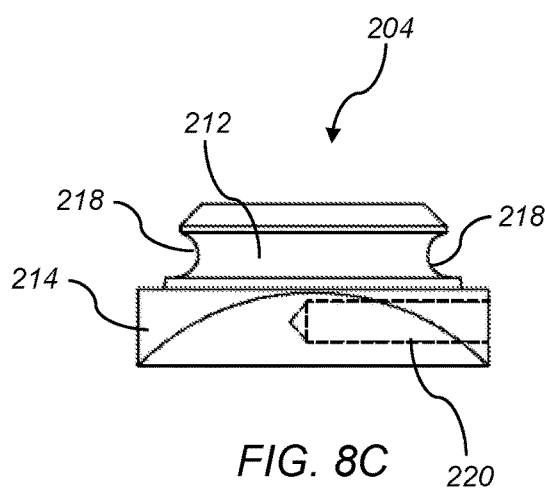
Figure 8B:
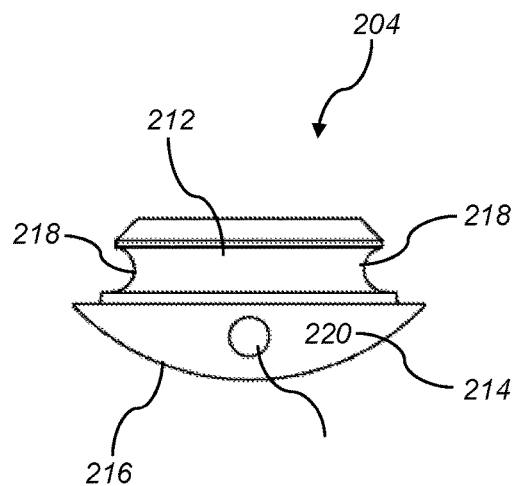

Referring now to FIGS. 6A and 6B, an impinging member 16, 200 according to another exemplary approach is illustrated. The impinging member 200 generally may have similar components as the impinging member 100. For example, the impinging member 200 may include a body 201 that may have a body portion 202 and a head portion 204, which may be separate and distinct components, or alternatively, may be integral with one another such that the body 201 is a unitary component. The body portion 202 as a separate component is illustrated in FIGS. 7A and 7B. The head portion 204 as a separate component is illustrated in FIGS. 8A-8C. The body portion 202 and the head portion 204 may be securely connected to each other by a seal 222, which may be, but is not limited to, an O-ring.

Referring now to FIGS. 7A and 7B, the body portion 202 may be generally cylindrically shaped, for example, where the impinging member 200 is a screw. However, it should be appreciated that the body portion 202 may have any shape capable of fitting within the second bore 26 of the body 22 of the tool holder 14. It should further be appreciated that the body portion 202 may include portions having differing dimensions, including, but not limited to, diameter or width, similar to the body portion 302 illustrated in FIG. 10A and described in more detail hereinafter.

The body portion 202 may include a first cavity 206 at a top end 207 thereof to receive an insertion tool, e.g., a screwdriver, to insert, e.g., screw, the impinging member 200 into the second bore 26. While the first cavity 206 generally may have any shape, including, but not limited to, a slot, a Phillips cross, a square, a hex, and the like, a star shape (or Torx), as illustrated in FIG. 7B, has been found to be particularly effective in achieving the predetermined torque value. The body portion 202 may also have a second cavity 208 at a bottom end 209 configured to receive a portion of the head portion 204. The body portion 202 may further include a groove 210 around at least a portion of the second cavity 208, and may be configured to receive at least a portion of the seal 222.

Referring now to FIGS. 8A-8C, the head portion 204 may have a first or insertion portion 212 that may be inserted into the second cavity 208 such that the body portion 202 and the head portion 204 may be joined together. The head portion 204 may also have a second or engagement portion 214 that may engage with the elongated body 20 at the socket 28 of the tool 12. The second portion 214 may have a radial surface 216 having a curved profile or shape, and the socket 28 may have substantially the same profile or shape. The radial surface 216 reduces or eliminates any stress between the second portion 214 and the elongated body 20 that may result from profiles or shapes having sharp corners. The radial surface 216 may substantially abut the bottom end 209 of the body portion 202 when the body portion 202 and the head portion 204 are joined together, as shown in FIG. 6A. The head portion 204 may further have a groove 218 at least partially around the first portion 212 that corresponds to the groove 210 in the body portion 202. The groove 218 may similarly be configured to receive at least a portion of the seal 222.

While FIGS. 7B and 8A illustrate the body portion 202 and the head portion 204 as having generally circular cross-sectional shapes, it should be appreciated that they may have any cross-sectional shape, including a circular shape with squared opposing edges, similar to the head portion 304 illustrated in FIG. 11A and described in more detail hereinafter.

Referring back to FIGS. 6A and 6B, the impinging member 200 may further include an extension 224 extending radially from the head portion 204. In the assembled state of the assembly 10, extension 224 may sit in the groove 29 in the elongated body 20 of the tool 12. The location of the groove 29 may correspond to the predetermined torque. Specifically, the predetermined torque may not be achieved until the extension 224 is seated within the groove 29. Thus, the extension 224 and the corresponding groove 29 may provide a visual and/or tactile indication that the predetermined torque has been achieved. The extension 224 may be an end portion of a pin 226. The head portion 204 may define a channel 220 in which the pin 226 may be inserted, as shown in FIGS. 8A-8C. Alternatively, the extension 224 may be integral with the head portion 204.

Figure 9A:
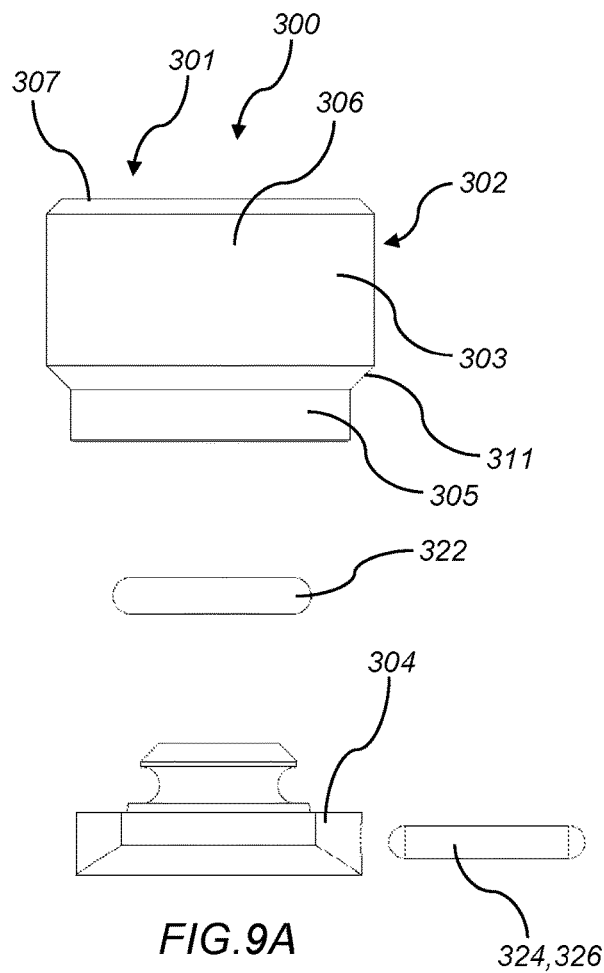
FIG. 9A is an exploded view of an impinging member of the assembly of FIGS. 1A and 1B according to another exemplary approach.
Figure 9B:
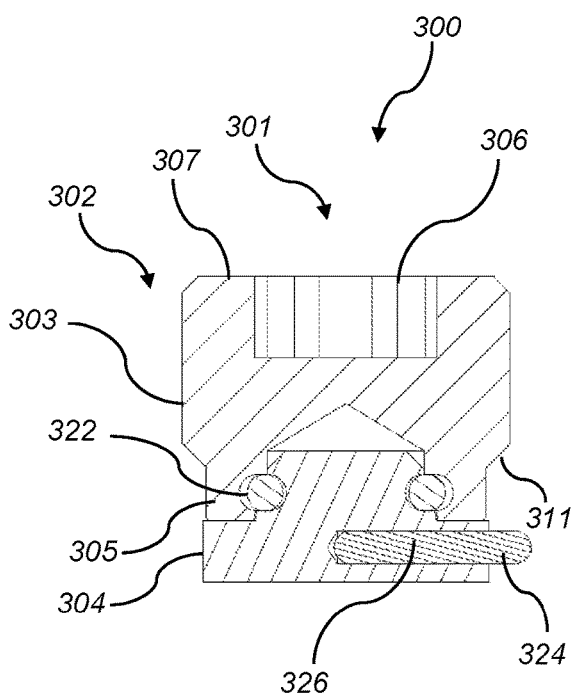
FIG. 9B is a cross-sectional view of the impinging member of FIG. 9A in an assembled state.
Figure 10A:
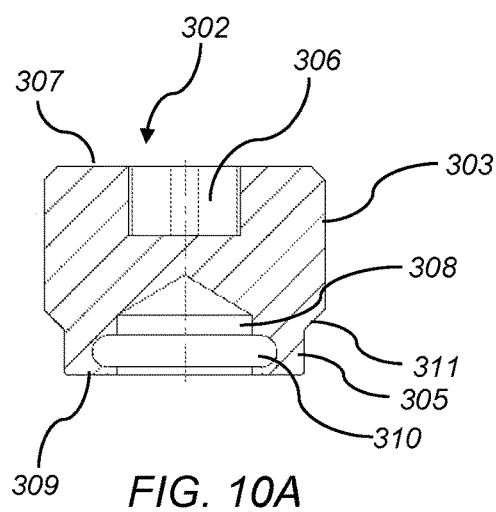
FIGS. 10A and 10B are front cross-sectional and top views, respectively, of a body portion of the impinging member of FIGS. 9A and 9B.
Figure 10B:
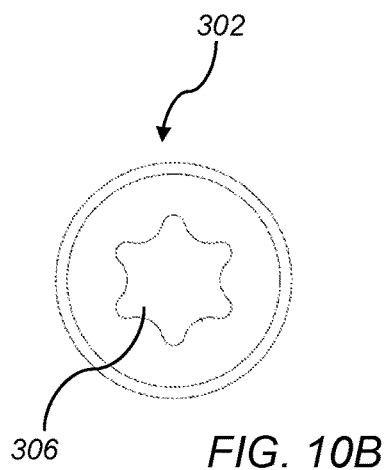

Referring now to FIGS. 9A and 9B, an impinging member 16, 300 according to another exemplary approach is illustrated. The impinging member 300 generally may have similar components as the impinging members 100 and 200. For example, the impinging member 300 may include a body 301 that may have a body portion 302 and a head portion 304, which may be separate and distinct components, or alternatively, may be integral with one another such that the body 301 is a unitary component. The body portion 302 as a separate component is illustrated in FIGS. 10A and 10B. The head portion 304 as a separate component is illustrated in FIGS. 11A-11C. The body portion 302 and the head portion 304 may be securely connected to each other by a seal 322, which may be, but is not limited to, an O-ring.

Referring now to FIGS. 10A and 10B, the body portion 302 may include an upper portion 303 and a lower portion 305. The upper portion 303 and the lower portion 305 may each have a generally cylindrical shape, for example, where the impinging member 300 is a screw. However, it should be appreciated that the upper portion 303 and/or the lower portion 305 may have any shape capable of fitting within the second bore 26 of the body 22 of the tool holder 14. The upper portion 303 may have a greater diameter or width than the lower portion 305. The body portion 302 may have a flanged or tapered section 311 connecting the upper portion 303 and the lower portion 305. This configuration may reduce the surface contact between the body portion 302 and the second bore 26, for example, where the impinging member 300 is a screw, thereby reducing or eliminating deformation in the body portion 302 that may occur when the impinging member 300 is subjected to a load, such as when the assembly 10 is in operation.

The body portion 302, specifically the upper portion 303, may include a first cavity 306 at a top end 307 thereof to receive an insertion tool, e.g., a screwdriver, to insert, e.g., screw, the impinging member 300 into the second bore 26. While the first cavity 306 generally may have any shape, including, but not limited to, a slot, a Phillips cross, a square, a hex, and the like, a star shape (or Torx), as illustrated in FIG. 10B, has been found to be particularly effective in achieving the predetermined torque value. The body portion 302, specifically the lower portion 305, may also have a second cavity 308 at a bottom end 309 configured to receive a portion of the head portion 304. The body portion 302 may further include a groove 310 around at least a portion of the second cavity 308, and may be configured to receive at least a portion of the seal 322.

Figure 11A:
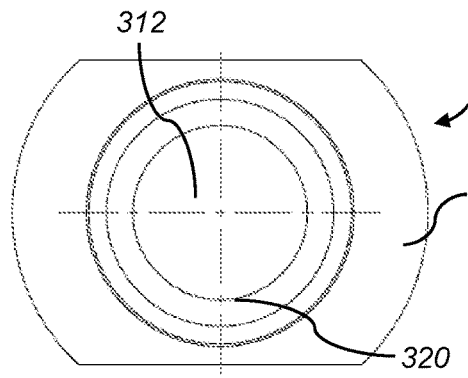
FIGS. 11A-11C are top, front cross-sectional, and side views, respectively, of a head portion of the impinging member of FIGS. 9A and 9B.
Figure 11C:
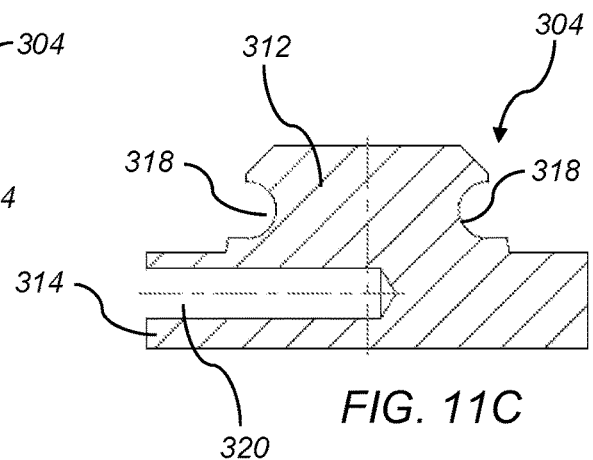
Figure 11B:
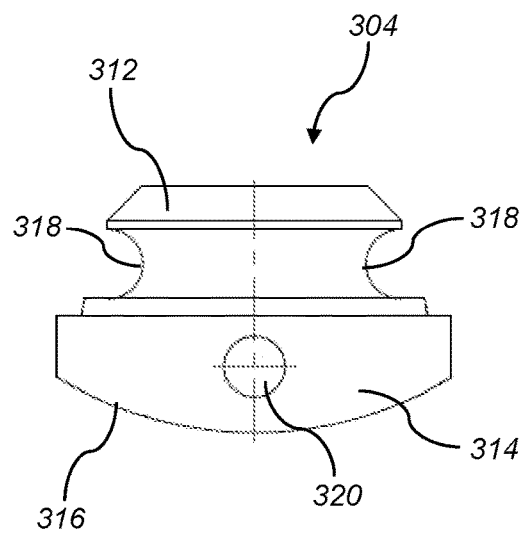

Referring now to FIGS. 11A-11C, the head portion 304 may have a first or insertion portion 312 that may be inserted into the second cavity 308 such that the body portion 302 and the head portion 304 may be joined together. The head portion 304 may also have a second or engagement portion 314 that may engage with the elongated body 20 at the socket 28 of the tool 12. The second portion 314 may have a radial surface 316 having a curved profile or shape, and the socket 28 may have substantially the same profile or shape. The radial surface 316 reduces or eliminates any stress between the second portion 314 and the elongated body 20 that may result from profiles or shapes having sharp corners. The radial surface 316 may be spaced axially from the bottom end 309 of the body portion 203 when the body portion 302 and the head portion 304 are joined together, as shown in FIG. 9A. Alternatively, the radial surface 316 may substantially abut the bottom end 309 of the body portion 302 when the body portion 302 and the head portion 304 are joined together, similar to the impinging member 200. The head portion 304 may further have a groove 318 at least partially around the first portion 312 that corresponds to the groove 310 in the body portion 302. The groove 318 may similarly be configured to receive at least a portion of the seal 322. While FIG. 10B illustrates the body portion 302 as having a generally circular cross-sectional shape, and FIG. 11A illustrates the head portion 304 as having a generally circular cross-sectional shape with squared opposing sides, it should be appreciated that they may have any cross-sectional shape.

Referring back to FIGS. 9A and 9B, the impinging member 300 may further include an extension 324 extending radially from the head portion 304. In the assembled state of the assembly 10, extension 324 may sit in the groove 29 in the elongated body 20 of the tool 12. The location of the groove 29 may correspond to the predetermined torque. Specifically, the predetermined torque may not be achieved until the extension 324 is seated within the groove 29. Thus, the extension 324 and the corresponding groove 29 may provide a visual and/or tactile indication that the predetermined torque has been achieved. The extension 324 may be an end portion of a pin 326. The head portion 304 may define a channel 320 in which the pin 326 may be inserted, as shown in FIGS. 11A-11C. Alternatively, the extension 324 may be integral with the head portion 304.

Figure 12:
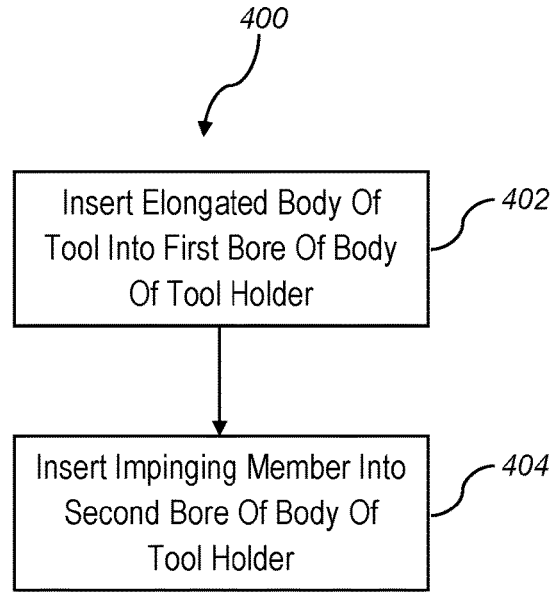
FIG. 12 is a schematic flow diagram of an exemplary method for assembling an assembly of a tool and a tool holder.

Referring now to FIG. 12, an exemplary method 400 for assembling a tool, such as the tool 12, and a tool holder, such as the tool holder 14, to be used in a manufacturing operation is illustrated. While method 400 is described with respect to assembly 10, including impinging members 100, 200, and 300 described above, it should be appreciated that method 400 may apply to any assembly and/or impinging member in which the steps of method 400 are applicable. Method 400 may begin at step 402 in which an elongated body 20 of a tool 12 may be inserted into a first bore 24 of a body 22 of a tool holder 14. The elongated body 20 may be inserted until a socket 28 in the elongated body 20 is substantially aligned with a second bore 26 of the tool holder 14. The second bore 26 may be substantially transverse to the first bore 24.

After step 402, method 400 may proceed to step 404 in which an impinging member 16, 100, 200, 300 may be inserted into the second bore 26 of the body 22 of the tool holder 14. Where the impinging member 16 is a screw, step 404 may include screwing the impinging member 16 into the second bore 26. Step 404 may be performed until a radial surface 116, 216, 316 of a head portion 104, 204, 304 of the impinging member 100, 200, 300 presses against or impinges on the elongated body 20 in the socket 28 to apply a predetermined torque.

Where the impinging member 100, 200, 300 includes an extension 124, 224, 324 extending radially from the head portion 104, 204, 304, step 404 may include inserting (e.g., screwing) the impinging member 100, 200, 300 until the extension 124, 224, 324 is seated within a groove in the elongated body 20 of the tool 12. The groove may correspond to the predetermined torque such that when the extension 124, 224, 324 is seated therein, the performer of method 400 may have visual and/or tactile feedback or confirmation that the predetermined torque has been achieved. Where the extension 124, 224, 324 is an end portion of a pin 126, 226, 326, method 400 may include inserting the pin 126, 226, 326 into a corresponding channel 120, 220, 320 in the head portion 104, 204, 304. This may be performed before or after step 402.

Further, where the head portion 104, 204, 304 is a separate and distinct component from a body portion 102, 202, 302 of the impinging member 100, 200, 300, method 400 may include assembling the body portion 102, 202, 302 and the head portion 104, 204, 304 together to form a body. This may be done by inserting an insertion portion 112, 212, 312 of the head portion 104, 204, 304 into a cavity 108, 208, 308 in the body portion 102, 202, 304. This may further include inserting a seal 122, 222, 322 into a groove 110, 210, 310 extending around at least a portion of the cavity 108, 208, 308, and then inserting the insertion portion 112, 212, 312 into the cavity 108, 208, 308 until the seal 122, 222, 322 is seated in a corresponding groove 118, 218, 318 extending at least partially around the insertion portion 112, 212, 312, such that the head portion 104, 204, 304 and the body portion 102, 202, 302 may be securely connected to each other. These steps may be performed before or after step 402.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An assembly comprising:
  a tool having an elongated body with a socket;
  a tool holder having a body with a first bore configured to receive at least a portion of the elongated body, and a second bore substantially transverse to the first bore; and
  an impinging member including a body having an end with a curved surface;
  wherein in an assembled state, a portion of the elongated body of the tool is positioned within the first bore of the body of the tool holder such that the socket and the second bore are substantially aligned, and the body of the impinging member is positioned within the second bore with the curved surface pressed against the elongated body in the socket at a predetermined torque; and wherein the impinging member includes an extension extending radially from the body of the impinging member, and the elongated body of the tool includes a groove extending from the socket, the extension sitting in the groove in the assembled state to ensure that the predetermined torque is met.

2. The assembly of claim 1, wherein the tool is an end mill.

3. The assembly of claim 1, wherein the impinging member is a screw.

4. The assembly of claim 3, wherein the screw has a hexalobular shaped head.

5. The assembly of claim 1, wherein the body of the impinging member includes a cylindrical body portion and a head portion having the curved surface.

6. The assembly of claim 5, wherein the cylindrical body portion includes a cavity configured to receive a portion of the head portion.

7. The assembly of claim 6, wherein the impinging member further includes a seal configured to maintain a secure connection between the cylindrical body portion and the head portion.

8. The assembly of claim 7, wherein the cylindrical body portion includes a first groove around at least a portion of an interior surface of the cylindrical body in the cavity, and the head portion includes a second groove around at least a portion of an outer surface of the head portion, the first groove and the second groove being configured to receive the seal.

9. The assembly of claim 7, wherein the seal is an O-ring.

10. The assembly of claim 1, wherein the predetermined torque is at least 25 ft/lbs.

11. An assembly comprising:
a tool having an elongated body with a socket and a groove;
a tool holder having a body with a first bore configured to receive at least a portion of the elongated body, and a second bore substantially transverse to the first bore; and
a screw including a body portion, a head portion, and a pin, the head portion having a curved surface at an end thereof, and a channel extending in a radial direction transverse to an axis of the screw, the channel being configured to receive a portion of the pin such that an end of the pin extends from the head portion;

wherein in an assembled state, a portion of the elongated body of the tool is positioned within the first bore of the body of the tool holder such that the socket and the second bore are substantially aligned, and the screw is positioned within the second bore with the pin seated in the groove and the curved surface pressed against the elongated body in the socket at a predetermined torque.

12. A method comprising:
providing an assembly including:
a tool having an elongated body with a socket and a groove extending from the socket;
a tool holder having a body with a first bore configured to receive at least a portion of the elongated body, and a second bore substantially transverse to the first bore; and
an impinging member including a body having an end with a curved surface and an extension extending radially from the body;
inserting a portion of the elongated body of the tool into the first bore of the body of the tool holder until the socket in the elongated body is substantially aligned with the second bore in the body of the tool holder; and
inserting the impinging member into the second bore until the curved surface of the end of the body of the impinging member is pressed against the elongated body in the socket at a predetermined torque, and the extension extending radially from the body of the impinging member sits in the groove in the elongated body extending from the socket to ensure that the predetermined torque is met.

13. The method of claim 12, further comprising assembling a body portion and a head portion together to form the body of the impinging member, the head portion having the end with the curved surface.

14. The method of claim 13, wherein the assembling of the body portion and the head portion together includes inserting an end of the head portion opposite the end with the curved surface into a cavity in the body portion.

15. The method of claim 12, wherein the predetermined torque is 25 ft/lbs.

16. The method of claim 12, wherein the impinging member is a screw, and inserting the impinging member into the second bore includes screwing the impinging member into the second bore.

17. The method of claim 16, wherein the screw has a hexalobular shaped head.

* * * * *